United States Patent
Abiko et al.

[11] Patent Number: 6,049,559
[45] Date of Patent: Apr. 11, 2000

[54] METHOD OF REFINING METAL TO HIGH DEGREE OF PURITY AND HIGH-FREQUENCY VACUUM INDUCTION MELTING APPARATUS

[75] Inventors: Kenji Abiko, 27-9, Takamori 6-chome, Izumi-ku, Sendai-shi, Miyagi; Hitoshi Kawano, Ise; Masanori Tsuda, Ise; Yasuhiro Nakai, Ise; Tadahito Nakajima, Ise; Masanobu Harada, Tokyo; Yoshihiro Ashino, Chigasaki, all of Japan

[73] Assignees: Shinko Electric Co., Ltd.; Kenji Abiko, both of Japan

[21] Appl. No.: 09/298,899

[22] Filed: Apr. 26, 1999

Related U.S. Application Data

[62] Division of application No. 08/943,186, Oct. 3, 1997, Pat. No. 5,974,077.

[30] Foreign Application Priority Data

Oct. 4, 1996 [JP] Japan .................................. 8-264580
Oct. 9, 1996 [JP] Japan .................................. 8-268729

[51] Int. Cl.[7] ........................................... F27D 7/06
[52] U.S. Cl. ........................... 373/140; 373/141; 373/158
[58] Field of Search ..................... 373/138, 139, 373/140, 141, 152, 153, 155, 156, 158; 219/647, 651, 677

[56] References Cited

U.S. PATENT DOCUMENTS 5,974,077  10/1999  Abiko et al. .............................. 373/140

*Primary Examiner*—Tu Ba Hoang
*Attorney, Agent, or Firm*—Bacon & Thomas, PLLC.

[57] ABSTRACT

A method of refining metal to be processed to a high degree of purity by heat-melting the metal in a melting furnace in the form of a metal crucible placed in a vacuum vessel. The method includes evacuating prior to melting, preheating the inside of the entire vacuum atmosphere including the inner wall surface of the vacuum vessel, component parts inside the vessel and the like in order to keep the total pressure within the vessel at $1 \times 10^{-8}$ Torr or lower, and effecting high frequency induction heating while controlling the partial pressure of each of $O_2$, $H_2$, CO in the atmosphere inside the vessel. Further, the vacuum vessel, the metal crucible and an induction heating coil attached to the crucible, each of which has double jacket structure, are heated or cooled by supplying circulating heating or cooling water in a water-passage space of each of the vacuum vessel, the metal crucible and the induction heating coil, so that the inside of the melting furnace is baked.

6 Claims, 6 Drawing Sheets

METHOD OF REFINING METAL TO HIGH DEGREE OF PURITY AND HIGH-FREQUENCY VACUUM INDUCTION MELTING APPARATUS

This application is a division of nonprovisional application Ser. No. 08/943,186 filed Oct. 3, 1997, now U.S. Pat. No. 5,974,077.

BACKGROUND OF THE INVENTION

1. Field of the Invention

This invention relates to a method of refining metal, for example, iron or its alloys to a high degree of purity in an ultra-high vacuum and a vacuum induction melting apparatus for putting the method into practice in order to prevent oxidation due to oxygen and water vapor which causes problems when metal of high purity is melted.

2. Background

Studies on metal of ultra-high purity have steadily progressed in recent years. In order to better understand the properties of these metals, there is a need for forming these metal materials of ultra-high purity into usable shapes and establishing the technology of refining metal to a ultra-high degree of purity. The term metal in this description means metal or metal alloy.

For example, a vacuum induction melting method, a floating zone melting method, etc. have heretofore been used for refining metal. These methods employ an electron beam, high-frequency induction energy and the like as a heat source. In particular, attention has been directed to the latter method as being advantageous in that there is no possibility of allowing impurities to penetrate through a refractory when the metal is melted.

Recently, there has been proposed an electron-beam, floating zone melting method combining both the aforementioned methods, and the processing is normally performed in a vacuum of about $10^{-6}$ Torr therein. Iron of the highest purity obtained according to the conventional methods usually has a resistance ratio of about 3,000.

Furthermore, studies on the technology of refining metal to a high degree of purity using a vacuum induction melting apparatus have steadily progressed in recent years. Such vacuum induction melting apparatus generally contain a high-frequency induction melting type crucible, that is, a high-frequency induction heating type crucible.

Each of those crucibles includes a crucible or crucible body made of refractory material such as alumina, magnesia and calcia, and an induction heating coil wound around the crucible at predetermined intervals. The crucible is made of refractory material. Metal in the crucible is melted by applying a high-frequency current to the coil around the crucible so as to utilize an induction eddy current flowing through the metal therein and the resistance of the metal.

There has been proposed a method of refining metal to a high degree of purity by a vacuum induction melting apparatus for heating metal by high-frequency induction heating in a crucible made of refractory material and placed in a high-vacuum vessel.

FIG. 1 shows a high-frequency vacuum induction melting apparatus which is used when metal is refined to a high degree of purity.

In this apparatus, a crucible 102 made of refractory material is placed in a vacuum vessel 101, and a high-frequency induction heating coil 103 used for induction-heating the metal to be melted in the crucible is fixedly mounted around the crucible 102.

In the vacuum induction melting apparatus, the crucible 102 placed in the vacuum vessel 101 is generally made by sinter-forming a metal oxide ($Al_2O_3$, MgO, CaO, etc.) and the induction heating coil 103 is wound around the crucible. Further, a high-frequency current is supplied to the induction heating coil 103 so as to melt a material (metal) in the crucible 102 by induction heating.

The induction heating coil 103 is formed such that the exterior of a water-cooled copper pipe is insulated by an asbestos or glass tape and the high-frequency current can be supplied from an external high-frequency power supply 105 to the induction heating coil 103 through the water-cooled cable 104.

A portion of the vacuum vessel 101 through which the water-cooled cable 104 passes has an insulation-vacuum seal structure, and a flange portion including a door. The vacuum seal portion thereof is vacuum sealed with an O-ring (e.g., of fluoro rubber).

In this apparatus, vacuum is achieved by a vacuum pump 106 combining an oil diffusion pump, an oil rotary pump and a mechanical booster pump together, and the attainable degree of vacuum therein is generally about $10^{-5}$ Torr, although this varies with the influence of the gas discharged from the crucible 102 made of refractory material, the vacuum vessel 101, the water-cooled cable 104 and so on.

In the use of the aforementioned conventional apparatus, the crucible made of refractory material causes inorganic compounds such as magnesia and alumina to be extracted from the surface of the crucible into the liquid metal. This increases the concentration of impurities all the more. This phenomenon unavoidably occurs when metal is vacuum-refined to a high degree of purity and makes it difficult to maintain the purity of the original material.

More specifically, in the use of the aforementioned conventional art, there has been the following problems, particularly in the case of refining metal based on the high-vacuum induction heating technology:

(1) The use of a crucible made of refractory material causes inorganic compounds to be extracted out of the crucible into mother liquid metal, and the mixture of $O_2$ as well as the desorption of adsorption gas ($H_2O$, $N_2$, $O_2$) hinders achieving a ultra-high degree of purity;

(2) Organic substance (hydrocarbon) and moisture are produced from the water-cooled cable and heating-coil insulating material, which results in an atmosphere rich in $H_2O$;

(3) The penetration of $O_2$ and $CO_2$ through the O-ring seal portion causes oxidation of the liquid metal.

Consequently, a rise in the operating pressure (degree of vacuum) ensues and particularly melting occurs in an atmosphere where the partial pressure of each of $O_2$, $H_2O$ and $CO_2$ is high, thus causing metal contamination. In the case of Fe, for example, the partial pressure of $O_2$ in the atmosphere needs to be $1 \times 10^{-10}$ Torr or lower in order to make the concentration of $O_2$ in liquid iron 10 ppm or lower; however, it has not been possible to achieve that degree of vacuum in the aforementioned conventional art.

Moreover, the introduction of impurities from the refractory material of the crucible make it difficult to maintain the purity of the original material by the use of the conventional method of refining metal to a high degree of purity in the conventional high-frequency vacuum induction melting apparatus.

As set forth above, the conventional technology of refining metal to a high degree of purity is problematic in that it is incapable of achieving a high degree of purity due to the limitation of the refining method and the unsatisfactory apparatus but also apt to increase the concentration of impurities in the metal.

SUMMARY OF THE INVENTION

Therefore, a first object of the present invention is to propose a method of refining metal to a high degree of purity by reducing the concentration of impurities so as to attain a higher degree of purity than at least the purity of the original material.

A second object of the present invention is to provide a high-frequency vacuum induction melting apparatus fit for refining metal to a high degree of purity.

To solve the aforementioned problems, the present inventors directed attention to metal crucibles in place of crucibles made of refractory material because the crucible body made of metal was free from the aforementioned impurities and gas and thus capable of melting and refining metal to a high degree of purity. However, the crucible body made of metal such as copper still developed problems arising from (1) the necessity of cooling the crucible; (2) the induction loss brought about by failure to form an electromagnetic field in the metal to be melted as the induction current on the secondary side concentrated on the wall of the metal crucible; and (3) contamination of the metal due to the $H_2O$, $O_2$ rich atmosphere caused by moisture produced from the surface of the inner wall of the furnace, the crucible, the coil, the cable or the like.

The present inventors then discovered that problem (1) could be dealt with by providing the crucible body with a water-cooled jacket structure; problem (2) was solved by inserting an insulating material in a plurality of places in the circumferential direction of the crucible so as to generate the electromagnetic field in the metal to be melted in the crucible. More specifically, the structure devised to deal with problem (2) was such that the crucible was first divided into a plurality of pillar-like segments and a slit was provided in between the segments so that the insulating material could be fitted therein.

However, though problem (2) was solved, the structure of (1) above needed an effective cooling method, whereas problem (3) required an effective furnace baking method.

Therefore, a third object of the present invention is to provide a baking method in a vacuum induction melting apparatus for refining metal to a high degree of purity.

A fourth object of the present invention is to provide a baking method in a melting furnace such that less water vapor, oxygen and carbon monoxide gases are produced, and an apparatus for putting the method into practice.

A fifth object of the present invention is to propose a heating apparatus for baking, and baking technique which are less complicated, easy to control and capable of reducing contamination of the metal.

The present inventors have made studies assiduously to solve the foregoing problems and succeeded in attaining a refining method to solve the problems as follows.

According to the present invention, a method of refining metal to be processed to a high degree of purity by heat-melting the metal in a melting furnace in the form of a crucible placed in a vacuum vessel is provided. The method includes the steps of evacuating prior to melting, preheating the inside of the whole vacuum atmosphere including the inner wall surface of the vacuum vessel, component parts inside the vessel and the like, desorbing water vapor from all surfaces simultaneously with the degassing from the metal in order to keep the total pressure within the vessel at $1\times10^{-8}$ Torr or lower, and effecting high-frequency induction heating while controlling the partial pressure of $O_2$, $H_2$ and CO in the atmosphere inside the vessel.

According to the present invention, a method of refining metal to a high degree of purity in which metal to be processed is melted by putting the metal in a melting furnace in the form of an induction heating type crucible placed in a vacuum vessel and electrifying an induction heating coil wound around the crucible is provided. The method includes the steps of loading a water-cooled metal crucible with the metal, drying a vacuum vessel, the crucible and the metal by preheating them in a vacuum before the metal is melted in the metal crucible, controlling the total pressure in the vacuum vessel so as to keep the total pressure at $1\times10^{-8}$ Torr or lower, simultaneously controlling an attainable degree of vacuum in the refining atmosphere to keep the partial pressure of oxygen ($P_{O_2}$) at $1\times10^{-10}$ Torr or lower, to keep the partial pressure of hydrogen ($P_{H_2}$) at 10 or higher, preferably 20 or higher and most preferably 100 or higher in terms of a $P_{H_2}/P_{H_2O}$ ratio by controlling the supply of $H_2$ so that the refining effect by $H_2$ becomes predominant and to keep the partial pressure of carbon monoxide ($P_{CO}$) at 10 or higher in terms of a $P_{CO}/P_{CO_2}$ ratio.

A high-frequency vacuum induction melting apparatus which is the apparatus for putting the aforementioned refining method into practice includes a vacuum vessel and a melting furnace in the form of a high-frequency induction heating type crucible, wherein the vacuum vessel is of double jacket structure that can be heated by circulating hot water supplied from an externally-installed heat exchanger; a vacuum exhaust system with a vacuum pump as an essential element for keeping the total pressure within the vacuum vessel at $1\times10^{-8}$ Torr or lower; a control-gas introducing port for regulating an atmosphere within the vacuum vessel; and a melting furnace in the form of a metal crucible that can be water-cooled and a high-frequency induction coil that is wound around the crucible and can be water-cooled.

According to the present invention, it is preferred to cool the metal crucible and the high-frequency induction coil by utilizing circulating water supplied from the heat exchanger.

Furthermore, the present inventors have developed a baking method as means of solving the foregoing problems and an apparatus for putting the method into practice.

A baking method in a vacuum induction melting apparatus according to the present invention includes the steps of providing the vacuum induction melting apparatus including a vacuum vessel, an induction heating type metal crucible placed in the vacuum vessel, an induction heating coil attached to the crucible and an externally-installed hot water supply unit, in which the vacuum vessel has a double jacket structure, and supplying circulating heating or cooling water in a water-passage space of each of the vacuum vessel, the metal crucible and the induction heating coil so as to be heated or cooled, whereby the inside of the melting furnace is baked.

The circulating water from the hot water supply unit according to the present invention is high-temperature (heating) water when the inside of the furnace is baked, and low-temperature (cooling) water when a material to be melted is induction-heated in the crucible.

The circulating water supplied to the water-passage space of each of the vacuum vessel and the coil is switched from heating water to cooling water in such a way that the remaining water is discharged from piping by introducing compressed air into the piping.

The baking is carried out by holding the temperature of the circulating heating water at 60° C. or higher.

Furthermore, a vacuum induction melting apparatus developed according to the present invention includes a vacuum vessel, an induction heating type metal crucible placed in the vacuum vessel, an externally-installed hot water supply unit, the vacuum vessel being of double jacket structure, and piping for coupling each of the water-passage spaces of the vacuum vessel, the crucible and an induction coil spirally wound around the crucible and the hot water supply unit. Compressed air piping and cooling water piping are connected between the respective water-passage spaces of the crucible and the coil in a mode capable of being switched.

According to this aspect of the present invention, the metal crucible has a side portion where an insulating material is inserted in between segments formed by circumferentially dividing the metal crucible.

The hot water supply unit according to the present invention contains a heater and its side wall is of double jacket structure so that cooling water can be passed therethrough.

DETAILED DESCRIPTION OF THE PREFERRED EMBODIMENTS

Preliminary Studies

A description will now be given of how the refining method according to the present invention has been accomplished on the basis of the results of tests made by the present inventors.

Generally, pure iron hardly reduces oxygen to a solid solution in the temperature range from room temperature up to its melting temperature of (1540° C.). When oxygen acts on pure iron at high temperatures, however, the form of the oxide is well known to undergo a iron (Fe)→worstite (FeO)→magnetite ($Fe_3O_4$)→hematite ($Fe_2O_3$) transition.

Figure 1:
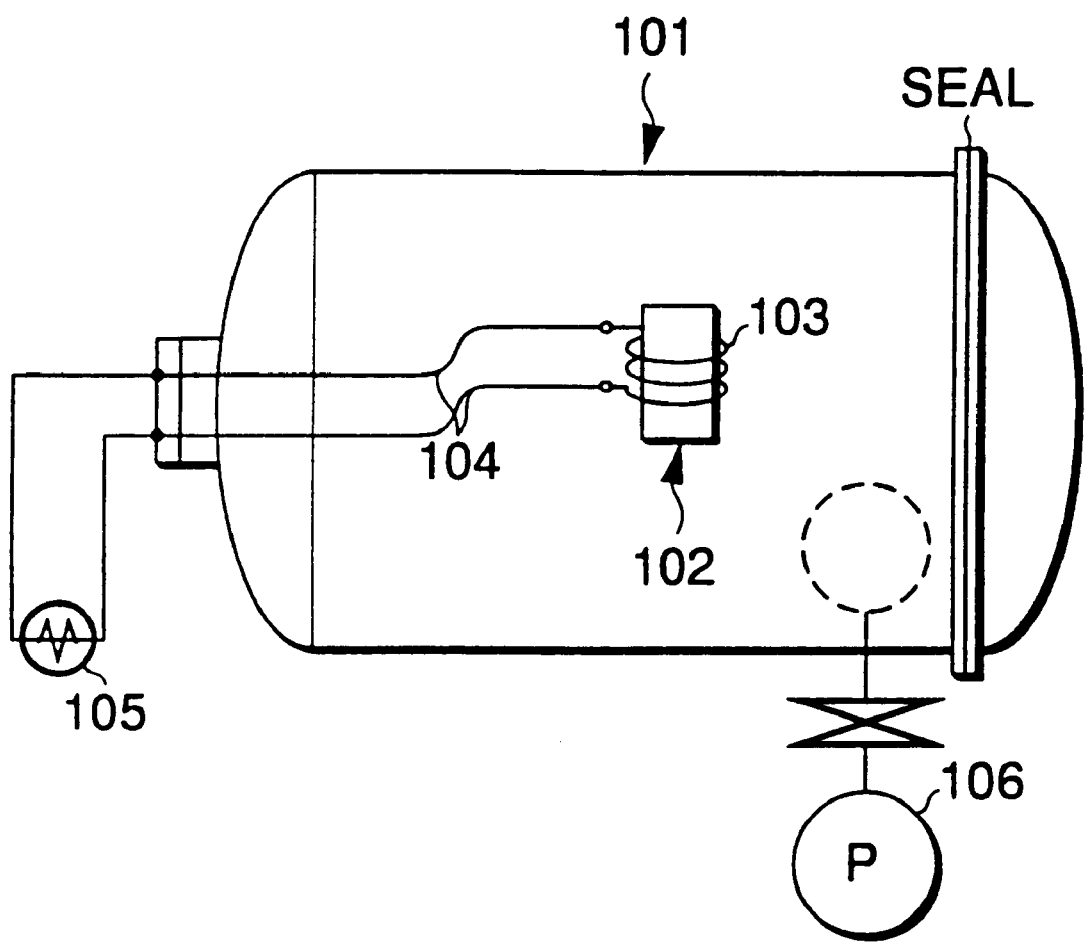
FIG. 1 shows a schematic diagram of a conventional vacuum induction melting apparatus.
Figure 2:
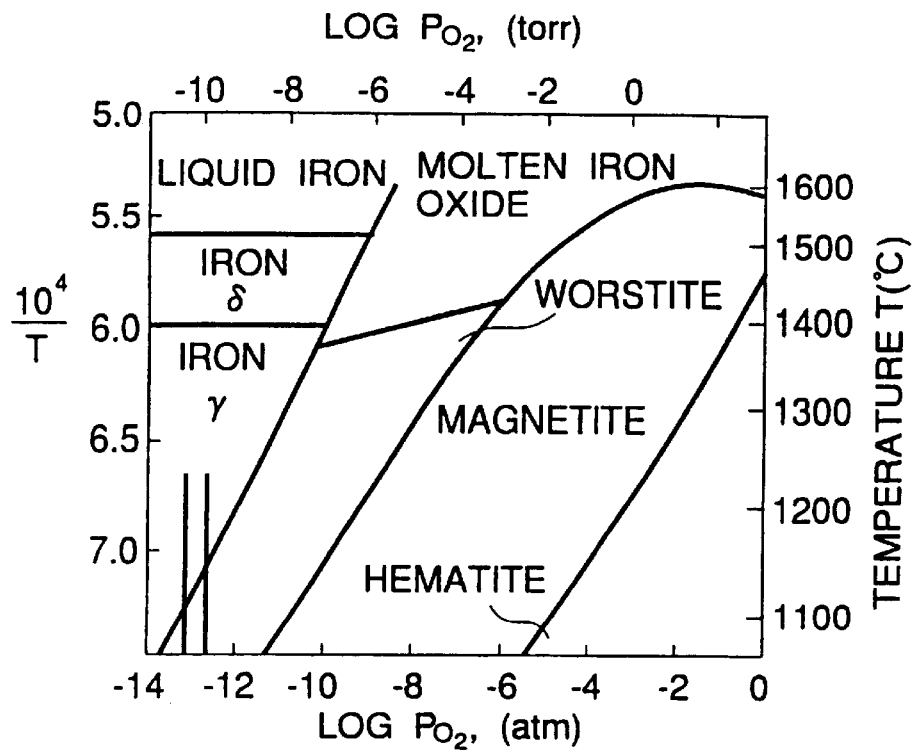
FIG. 2 shows a graph showing the relation between the partial pressure of oxygen and iron oxide.

FIG. 2 shows the transition of an iron oxide when the partial pressure of oxygen ($P_{O_2}$) varies. As is obvious from FIG. 2, pure iron undergoes a transition from iron to hematite as the partial pressure of oxygen rises. In other words, when the partial pressure of oxygen is as high as over $10^{-4}$ Torr, oxides of worstite, magnetite and hematite are thickly formed on the surface of iron and when the partial pressure of oxygen ($P_{O_2}$) becomes about $10^{-5}$–$10^{-9}$ Torr, the layers of worstite and magnetite are seen to be thinly formed thereon.

When the partial pressure of oxygen $P_{O_2}$ becomes $10^{-10}$ Torr or lower in this connection, the formation of the oxide (worstite) is extremely delayed and it is possible to refine metal to a high degree of purity stably for hours to that extent.

The studies made by the present inventors, however, revealed that simply raising the degree of vacuum in the atmosphere was unsatisfactory for refining metal to a high degree of purity. The reason for this is attributed to that fact that though oxygen is generally regarded as a gas for oxidizing the surface of pure iron at high temperatures, water vapor tends to more strongly oxidize the surface thereof.

Figure 3:
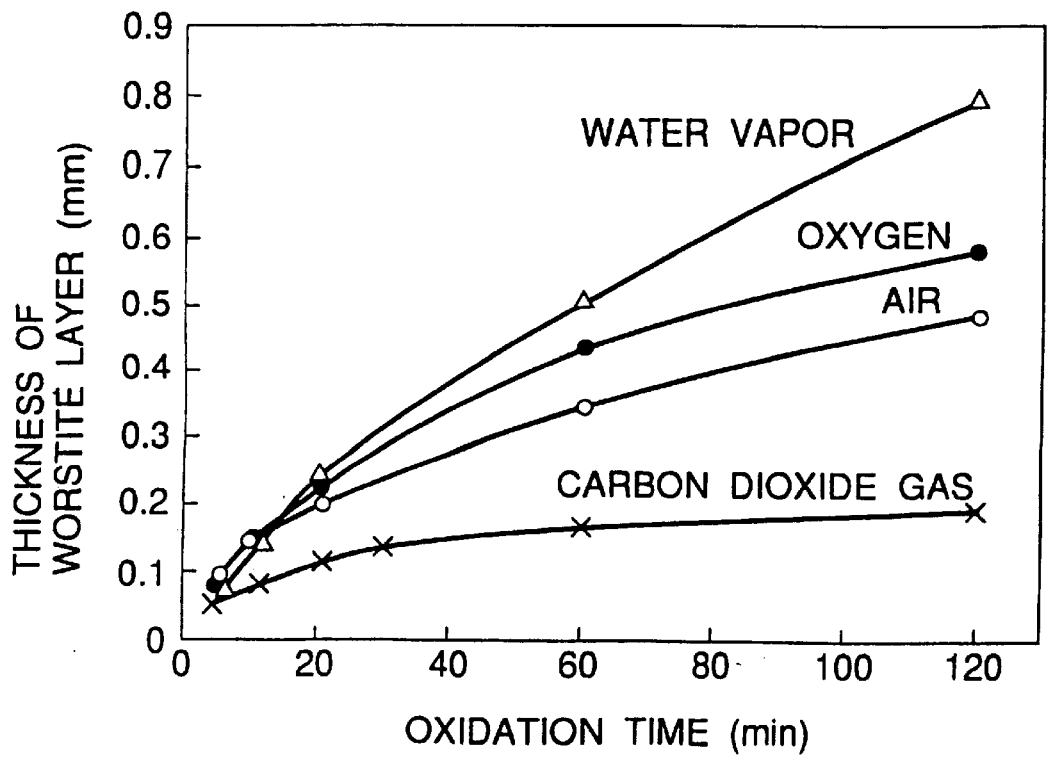
FIG. 3 shows a graph showing the influence of various gases on a worstite layer.

FIG. 3 shows the relation between the thickness of the worstite layer formed when Armco iron is heated to 1000° C. and the holding time in each atmosphere. From FIG. 3, it is obvious that the formation of worstite on the surface of iron is facilitated in the order of water vapor, oxygen, air and carbon dioxide gas. In other words, water vapor subjects pure iron to high-temperature oxidation most vehemently. This is considered attributable to the fact that oxygen and hydrogen are dissociated from water vapor on the surface of iron, thus accelerating the high-temperature oxidation.

Therefore, in order to refine metal to a high degree of purity, $H_2O$ in addition to the degree of vacuum must be controlled. Consequently, the conclusion drawn according to the present invention was that it was effective to pre-dry the vacuum atmosphere (vacuum vessel, crucible, metal to be processed) so as to remove $H_2O$ and control the $P_{H_2}/P_{H_2O}$ ratio.

Figure 4:
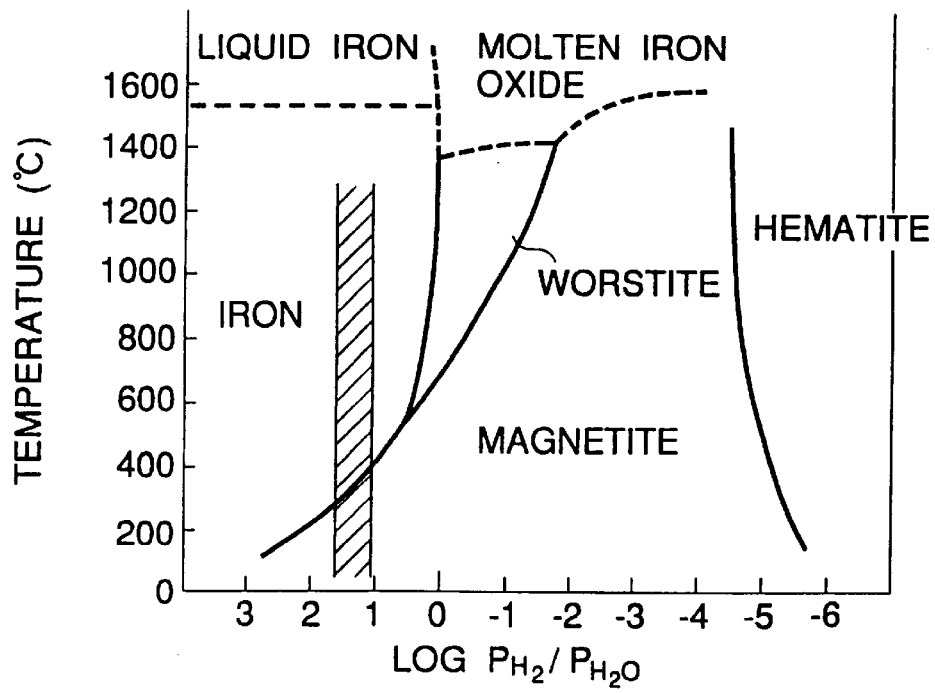
FIG. 4 shows a graph showing the relation between $P_{H_2}/P_{H_2O}$ and iron oxide.

FIG. 4 shows the relation between $P_{H_2}/P_{H_2O}$ affecting the formation of oxides and temperatures. As shown in FIG. 4, the ratio of the partial pressure of hydrogen ($P_{H_2}$) to that of water vapor ($P_{H_2O}$) is an important factor for the high-temperature oxidation of iron. In other words, when $P_{O_2}$ is sufficiently decreased, pure iron is seen to exist stably without being high-temperature oxidized as $P_{H_2}/P_{H_2O}$ grows greater.

Therefore, the application of ultra-high vacuum technology simultaneously with control over the quantity of $H_2$ gas, according to the present invention, has made it possible to the $P_{H_2}/P_{H_2O}$ ratio to 10 or higher and conduct oxidation-free refinement for many hours. In the case of a normal high vacuum refining atmosphere in this connection, when $P_{H_2}/P_{H_2O}$ remains at about $10^{-2}$, as shown in FIG. 4, iron forms a stable magnetite area in a wide temperature zone. Consequently, the conventional vacuum induction melting apparatus is seen to be incapable of stably refining pure metal or iron alloy for many hours.

Moreover, not only oxygen and water vapor but also carbon dioxide gas to a lesser extent, subjects iron to high-temperature oxidation. In other words, oxygen and carbon monoxide gas are dissociated from carbon dioxide gas and this makes the high-temperature oxidation proceed. Consequently, control of the carbon dioxide gas is another aspect according to the present invention.

Figure 5:
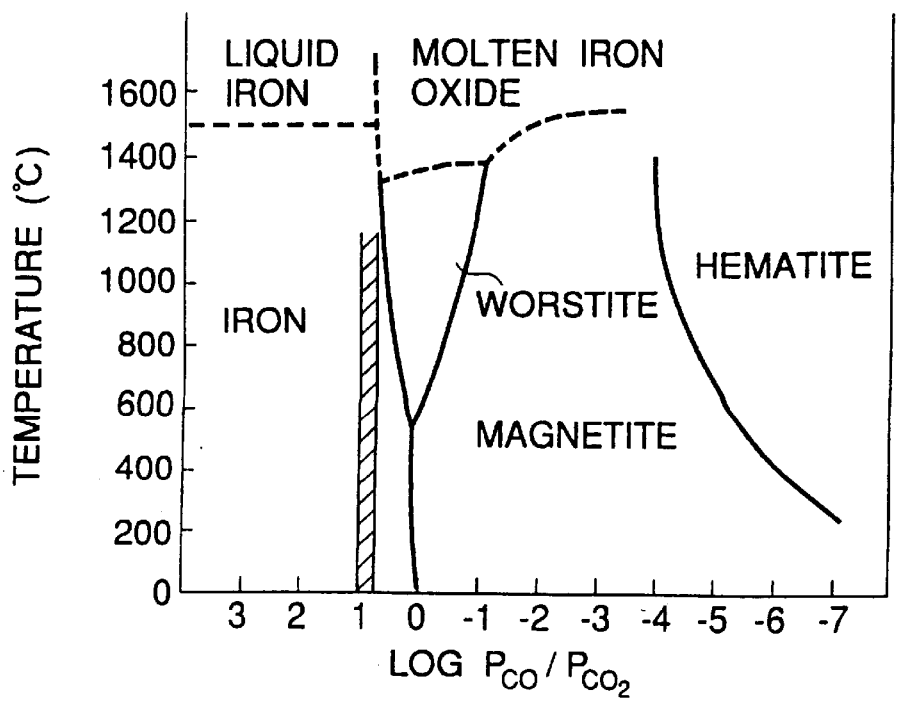
FIG. 5 shows a graph showing the relation between $P_{CO}/P_{CO_2}$ and iron oxide.

As shown in FIG. 5, pure iron is kept stable even at high temperatures when the ratio of the partial pressure of carbon monoxide ($P_{CO}$) to that of carbon dioxide ($P_{CO_2}$) is positive and grows higher. In the conventional technology, magnetite is stable since $P_{CO}/P_{CO_2}$ is about $10^{-1}$. According to the present invention, the $P_{CO}/P_{CO_2}$ ratio is set to 10 or higher so that metal iron is stable in this zone.

As set forth above, not only the degree of vacuum in the refining atmosphere but also the concentration of oxygen, water vapor and carbon dioxide gas is seen to seriously affect the high-temperature oxidation of iron when metal is refined to a high degree of purity. Therefore, according to the present invention, the relation between the vapor pressure of iron and iron oxide and temperatures in addition to, as occasion demands, control of the degree of vacuum, the concentration of $O_2$, $H_2O$ and $CO_2$ is taken into consideration for control purposes.

For example, the development of the ultra-high vacuum refining technology was based on the conclusion that the preferred condition of carrying out the refining of pure iron for many hours was to make the total pressure in the refining atmosphere in the vacuum vessel a ultra-high vacuum zone at $10^{-8}$ Torr or lower simultaneously with setting $P_{O_2}$ at $10^{-10}$ Torr or lower, $P_{H_2}/P_{H_2O}$ at 10 or higher, and $P_{CO}/P_{CO_2}$ at 10 or higher.

The present inventors also studied the influence of the refractory of the crucible on the refining for increasing purity. The refractory of the crucible contains impurities such as Cl, S, Pb, C and so on, to say nothing of oxides and also makes unavoidable the generation of O simultaneously when the component element (metal) is introduced. Moreover, the oxides in the components are dissociated from the refractory material of magnesia and act on the liquid iron so as to supply O to the liquid iron. An example of the reaction is given by the following expression:

$$MgO(s) = Mg(g) + 2O_2(g)$$

In other words, as shown by the expression above, O is dissociated from the oxides such as MgO, $Al_2O_3$, $SiO_2$, CaO contained in the refractory material and is incorporated into the liquid iron.

Further, the liquid iron and the refractory material directly react with each other, thus producing O as follows:

$$Fe(l) + MgO(s) = Mg(g) + O$$

In other words, the concentration of oxygen in the liquid metal is raised through this reaction.

With respect to the crucible, further, the corrosion of the refractory material due to C in the liquid iron occurs and carbon monoxide is produced through the reaction given by the following expression:

$$SiO_2(s) + 2C = Si + 2CO(g)$$

Thus, the limitation of deoxidation of the liquid iron due to C or H becomes considerably greater than a theoretic value and often what is of the 100 ppm class since O is supplied to the liquid iron because of the dissociation of the oxide in the component constituting the refractory material and its reaction with the liquid iron in the case of the melt-refining reaction in the crucible made of refractory material.

When the melt-refining is carried out in the crucible made of refractory material, moreover, the metal component in the refractory material tends to be extracted into the liquid iron and particularly regarding $SiO_2$ in the refractory material, Si reacts with Fe and becomes easily and rapidly soluble in Fe.

Consequently, a metal crucible that can be water-cooled is employed according to the present invention, so that the metal can be refined to a high degree of purity without the influence of the aforementioned refractory material.

Under the ultra-high vacuum employed in the refining method according to the present invention, all of the impurity elements whose vapor pressure is higher than that of Fe are removable by evaporation. Since the vapor pressure of Fe at 1600° C. is 0.039 Torr, substances such as Al, Cu, Mg, Zn, C whose vapor pressure are higher than that of Fe may be removed by evaporation.

Although the vapor pressure of FeO, in particular, is lower than that of Fe, the specific gravity of FeO is about 70% of Fe and as the impurities tend to concentrate on the surface, it is quite possible that the impurities are removable by evaporation.

Even with removal of impurities by evaporation, the mean free path should be followed with the degree of vacuum at the several m class so as to prevent the evaporation from being suppressed because of the vapor which remains on the surface of liquid metal. In this regard, since the evaporation of oxides constituting the refractory material occurs when the crucible is made of the conventional refractory material, the vapor pressure of the oxide on the surface of liquid metal rises and this makes it difficult to remove the impurities in the liquid metal by evaporation.

First Embodiment

Figure 6:
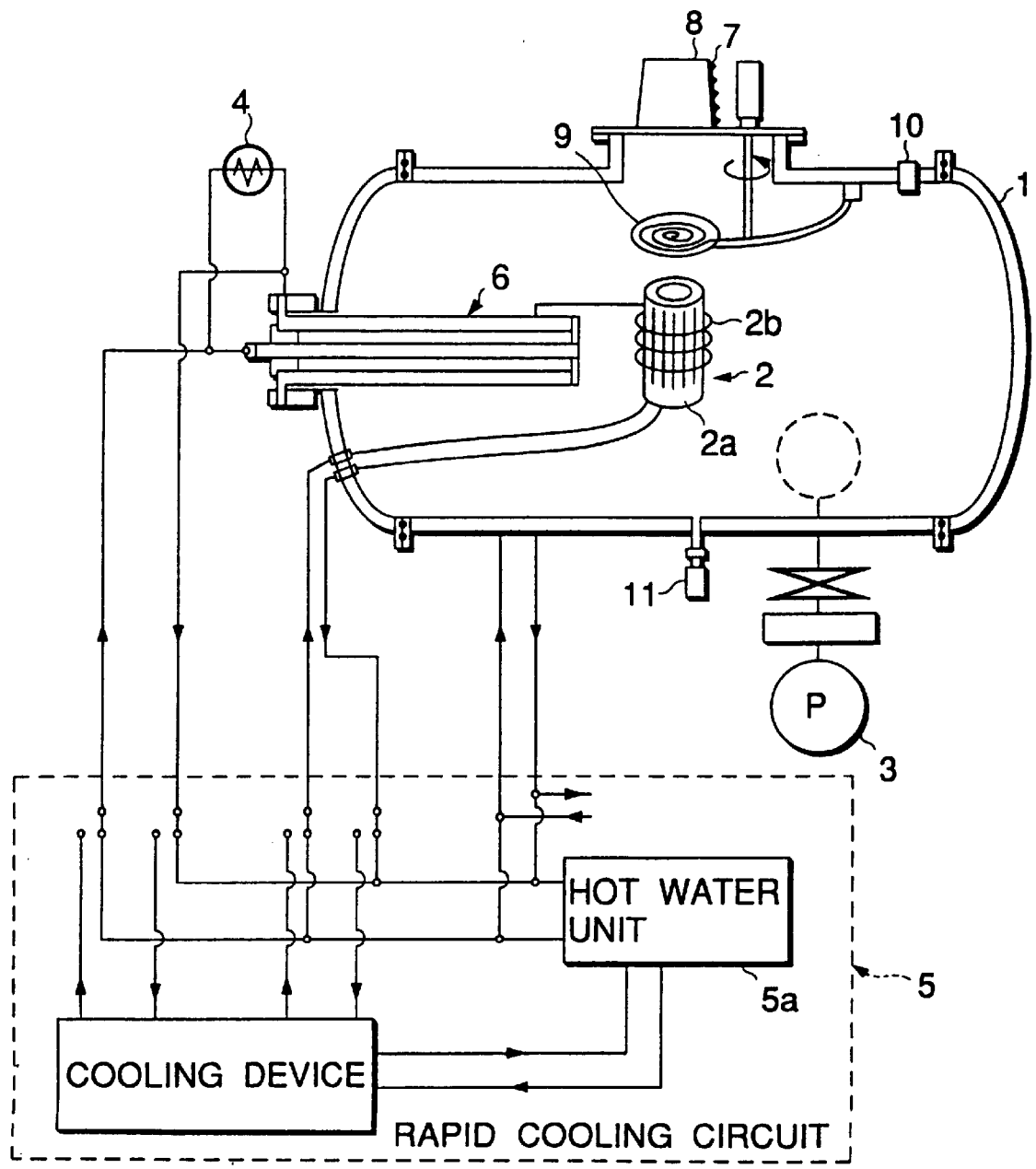
FIG. 6 shows a schematic diagram of a vacuum induction melting apparatus for use in a method, according to a first embodiment of the present invention.

Referring to FIG. 6, there will be given the description of a vacuum induction melting apparatus for putting the aforementioned method into practice.

The apparatus according to the present invention chiefly includes a vacuum vessel 1, an induction heating type melting furnace 2 in the form of a crucible contained in the vacuum vessel, a vacuum pump 3, a high-frequency power supply 4 and a heat exchanger 5.

The vacuum vessel 1 is of double jacket structure which is advantageous for uniform heating. In order to effect preheating (baking) prior to the melting operation, cold water or hot water (from room temperature to about 110° C.) from the heat exchanger 5 in an external water circulating system can be supplied to the jacket.

With this hot-water jacket structure, the entire contents of the vacuum vessel 1 can be kept at 60° C. or higher, so that water vapor is removed from the surfaces of the vessel and various parts (crucible, wire cable, coil, and other parts) thereof.

A heater may be used for any one of the component parts (e.g., observation window and vapor deposition preventive plate) where hot water is not utilizable.

The melting furnace 2 includes a water-cooled metal crucible 2a and a high-frequency induction heating coil 2b surrounding the crucible, these being water-cooled with the cooling water supplied from the heat exchanger 5. The crucible 2a is preferably made of non-magnetic metal such as copper and more preferably of such a type that is divided into a plurality of circumferential segments so that a ceramic material or the like can be held between the segments.

The vacuum pump 3 may be any pump capable of keeping the whole vessel pressure at $1 \times 10^{-9}$ Torr or lower, the vacuum pump being a vacuum exhaust system equipped with a cold trap of liquid nitrogen class advantageous for the exhaust of $H_2O$.

Further, equipment for introducing nitrogen gas for recovering the atmospheric pressure, Ar gas for regulating the atmosphere in the vessel and $H_2$ gas for controlling the $P_{H_2}/P_{H_2O}$, together with the vacuum exhaust system is added to the vacuum vessel 1.

In this case, it is essential to perform the operation in such a manner that the partial pressure of $O_2$ in the vacuum exhaust system is lowered at all times because the degree of vacuum on the order of $1\times10^{-10}$ Torr is unobtainable unless $O_2$ is prevented from penetrating through the door seal O-ring), the coil seal (O-ring) or a seal using inorganic material and plastic insulating material. Preferably, as shown in FIG. 6, the partial pressure of $O_2$ may be lowered by sealing the inlet portion of the induction heating coil 2b with insulating material of glass or ceramics together with organic insulating material (hard to crack) such as Teflon to provide a $N_2$ purging area 6 between the interior of the vessel and the outside (atmosphere).

In addition, the vacuum vessel 1 is provided with an observation window 8 that can be heated with a heater 7 and a vapor deposition preventive plate 9 for preventing evaporating metal from being deposited on the window in order to maintain visibility, the vapor deposition preventive plate being situated in the vessel under the observation window 8. Further, reference numeral 10 denotes a control-gas introducing port for introducing $H_2$, Ar, $N_2$ and the like; and 11, any kind of sensor with a heater.

REFERENCE EXAMPLE

The vacuum induction melting apparatus shown in FIG. 6 was used to refine pure iron in this example.

In the melting furnace 2 of the vacuum induction melting apparatus used in this case, no refractory material was used for the crucible 2a but a water-cooled metal crucible was employed instead, and the induction heating coil 2b was of such a type that no insulating material was used. For example, the crucible 2a with slits was supplied with power from a high-frequency power supply via an induction heating coil. The reason for the crucible like this to be employed according to the present invention is that problems originating from refractory material as stated above can be eliminated. Since dissolved oxygen uniformly appears on the surface as the molten metal is vigorously stirred in the metal crucible, refining action such as reduction smoothly proceeds.

First, the vacuum vessel 1 was evacuated with the vacuum pump 3 to attain a target degree of vacuum ($1\times10^{-8}$ Torr or lower) in the vacuum vessel 1.

Subsequently, the vacuum vessel, the metal melting furnace, the induction heating coil, the water-cooled cable were preheated by supplying hot water ($\geq 60°$ C.) from the hot-water generator 5a of the heat exchanger 5 to the jacket of the vacuum vessel 1 before the melt-refining operation was started. By the preheating (baking) prior to the melting operation, removal of $H_2O$ from all surfaces of parts (e.g., the inner wall of the vessel, the crucible, the heating coil, etc.) within the vacuum vessel 1 was attempted, so that no $H_2O$ was produced in the vessel during the melting operation. This preheating (baking) can effectively operate to prevent the re-adsorption of the gas extracted from the surface of the cooled crucible into the molten metal during the melting operation.

Then power was supplied from the high-frequency power supply 4 to the induction heating coil 2b so as to melt the metal (iron) in the crucible.

As a result of refining under the melting conditions above, the quantity of emission gas was found lower by two digits than the quantity thereof in the ordinary vacuum induction melting furnace in this example; namely, the partial pressure of oxygen $P_{O_2}$ was reduced to $1\times10^{-10}$ Torr. The apparatus used was equipped with a vacuum exhaust pump of such type that the total pressure was reducible to $1\times10^{-10}$ Torr or lower and included at least a cold trap of the liquid nitrogen type. Moreover, the cold trap forcibly exhausts $H_2O$, and $H_2$ is introduced so that the $P_{H_2}/P_{H_2O}$ ratio could be increased.

This refining operation was performed through the steps of using the water-cooled metal crucible, baking the vacuum vessel, the metal crucible and the melting material, considerably decreasing the $H_2O$ gas as the principal component in the vacuum atmosphere, and creating a reduction atmosphere by the $H_2$ introducing equipment, whereby melting of metal of high purity without oxidation is achieved.

Moreover, the removal of impurity and gas components in the liquid metal by evaporation during the melting operation was promoted by controlling the total pressure in the refining atmosphere within the vacuum vessel and the mean free path so that the total pressure and the stroke became $1\times10^{-8}$ Torr or lower and several m or greater, respectively.

A description will subsequently be given of an example in which iron was melted and refined to a high degree of purity under the refining method according to the present invention.

Table 1 shows analysis values of components of the melting materials (raw iron) used in the example.

TABLE 1

| elements | Al | B | C | Cd | Cr | Cu | H | Mg | Mn | N | O | P | Pb | S | Ti | Zn |
|---|---|---|---|---|---|---|---|---|---|---|---|---|---|---|---|---|
| ppm | 0.5 | 0.9 | 2.8 | 0.004 | 0.2 | 9.3 | 1.95 | 0.02 | 0.02 | 3.3 | 52.5 | 0.6 | 0.3 | 3.1 | 0.1 | 7.5 |

Table 2 shows refining results when the melting materials were not subjected to baking as an essential condition according to the present invention. The quantity of oxygen is still considerably large in the refining and melting tests.

TABLE 2

| elements | Al | B | C | Cd | Cr | Cu | H | Mg | Mn | N | O | P | Pb | S | Ti | Zn |
|---|---|---|---|---|---|---|---|---|---|---|---|---|---|---|---|---|
| ppm | 0.5 | 0.03 | 2.0 | 0.001 | 0.19 | 0.7 | 0.2 | 0.04 | 0.02 | 4 | 236 | 0.8 | 0.01 | 3.8 | 0.1 | 1.4 |

Table 3 shows a comparative example for ingots refined in the vacuum induction melting apparatus according to the present invention with baking applied to the ingots materials. However, in this example, the apparatus exhibited a slight vacuum leakage due to leakage from the sealing portion. Further, attainable degrees of vacuum during the refining operation is also shown in Table 4.

TABLE 3

| elements | Al   | B   | C   | Cd     | Cr  | Cu  | H    | Mg    | Mn   | N   | O  | P   | Pb   | S   | Ti   | Zn   |
|----------|------|-----|-----|--------|-----|-----|------|-------|------|-----|----|-----|------|-----|------|------|
| ppm      | <0.1 | 0.9 | 0.9 | <0.001 | 0.4 | 1.2 | 0.36 | <0.01 | 0.02 | 2.2 | 90 | 1.0 | <0.1 | 5.2 | <0.1 | <0.1 |

TABLE 4

| components | partial (Torr) |
|---|---|
| $H_2$ | $7.7 \times 10^{-11}$ |
| $H_2O$ | $4.6 \times 10^{-10}$ |
| $N_2$ | $1.3 \times 10^{-9}$ |
| CO | $1.9 \times 10^{-10}$ |
| $O_2$ | $9.1 \times 10^{-10}$ |
| Ar | $7.6 \times 10^{-11}$ |
| $CO_2$ | $3.9 \times 10^{-11}$ |
| total pressure | $3.5 \times 10^{-9}$ |

TABLE 6

| components | partial (Torr) |
|---|---|
| $H_2$ | $5 \times 10^{-9}$ |
| $H_2O$ | $5 \times 10^{-10}$ |
| $N_2$ | $5 \times 10^{-10}$ |
| CO | $2 \times 10^{-10}$ |
| $O_2$ | $1 \times 10^{-10}$ |
| $CO_2$ | $4 \times 10^{-11}$ |
| total pressure | $7 \times 10^{-9}$ |

As is obvious from the results shown in tables 3 and 4, the quantity of oxygen in the components is large in this example because the partial pressure of oxygen is slightly high and because $P_{H_2}/P_{H_2O}$ is low. However, Al, C, Cd, H, Mg, N, Pb were lower and when baking is carried out even though there occurred leakage to some extent, it was found that considerable improvement was made in comparison with the preceding example with the omission of baking.

Subsequently, the apparatus shown in FIG. 6 according to the present invention was tested in such a manner as to satisfy all the refining conditions of the invention.

More specifically, iron was subjected to vacuum refining (especially deoxidized) under the refining conditions including: (1) setting the partial pressure of oxygen at $1 \times 10^{-10}$ Torr or lower; (2) suppressing the production of $H_2O$ in order to secure $P_{H_2}/P_{H_2O}$ at least 100 or higher, (3) allowing $H_2O$ to be generated to the extent that not less than 1 m of the mean free stroke was secured when $H_2$ was introduced with $P_{H_2}/P_{H_2O}$ set at 100 or higher; (4) suppressing the generation of $CO_2$ so as to secure $CO/CO_2$ at 10 or higher or lowering the generation of $CO_2$ so as to suppress the oxidizing reaction; (5) providing the water-cooled metal crucible equipped with slits for cooling the crucible by passing water therethrough and practically dispensing with a refractory material in contact with the liquid metal; and (6) putting into practice the refining and melting method for the melting material in the crucible by induction heating.

Table 5 shows analysis values of ingots obtained under this refining method. Further, attainable degrees of vacuum during the refining operation is also shown in Table 6.

As shown in Tables 5, 6, the refining method conforming to the present invention exhibited excellent results.

As set forth above, according to the present invention, it is possible to refine metal to an extremely high degree of purity. Using the method according to the present invention, C on the order of 10 ppm can be reduced to the order of 1 ppm on condition that O in the liquid metal is 30 ppm or greater and deoxidizing refining with the addition of $H_2$ is feasible. Since the crucible is made of low-temperature metal such as water-cooled copper, no solution of metal and no supply of O occurs and consequently metal can be refined to a high degree of purity very close to the theoretic value.

Second Embodiment

Figure 7:
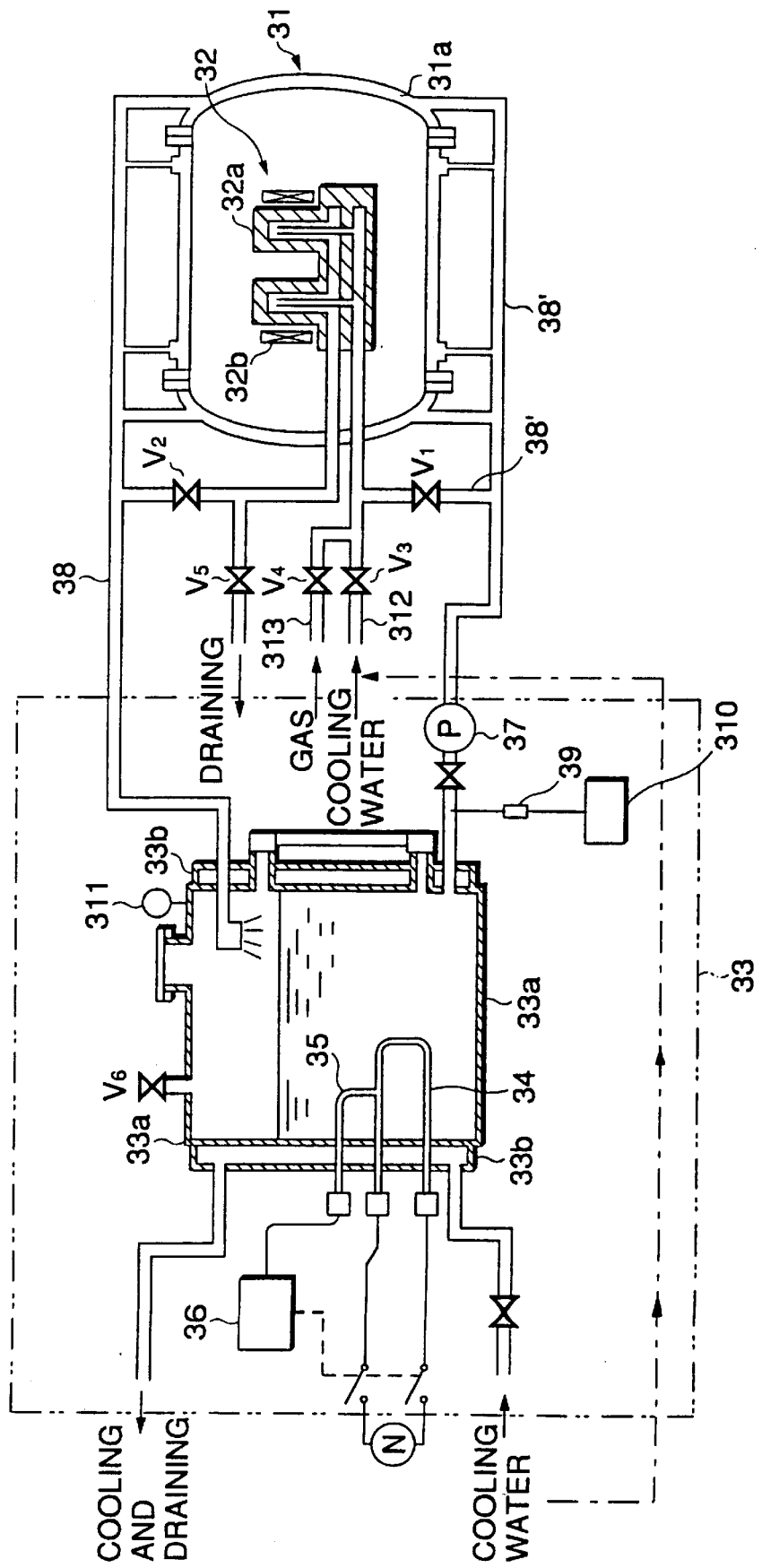
FIG. 7 shows a sectional view of a vacuum induction melting apparatus according to a second embodiment of the present invention.

FIG. 7 shows a second embodiment of a vacuum induction melting apparatus regarding an exemplary baking apparatus for a furnace.

As shown in FIG. 7, a vacuum induction melting apparatus includes a vacuum vessel 31 for use in a high-frequency vacuum induction melting crucible furnace for refining metal, in which an induction heating type metal crucible 32 is placed in the vacuum vessel 31 and a hot-water supply unit 33 is installed outside the vessel 31.

The vacuum vessel 31 is of double wall structure so that the whole wall forms a water-passage jacket 31a and circulating hot water ($\geq 60°$ C.) is supplied from the hot-water supply unit 33 to the inside of the water-passage jacket.

The reason for the construction of the outer wall of the vacuum vessel 31 in the double jacket form is to bake the furnace by passing hot water through the water-passage jacket 31a. What is important in baking of this kind is to heat the vessel and its contents uniformly. In this sense, the double jacket structure is most suitable. Unless heating is effected uniformly, the low-temperature portion of the vessel cannot be degassed and gas driven off in some other portion of the vessel will be adsorbed by the low-temperature portion.

TABLE 5

| elements | Al   | B   | C   | Cd     | Cr  | Cu  | H   | Mg    | Mn   | N   | O | P   | Pb   | S   | Ti   | Zn   |
|----------|------|-----|-----|--------|-----|-----|-----|-------|------|-----|---|-----|------|-----|------|------|
| ppm      | <0.1 | 0.9 | 0.9 | <0.001 | 0.2 | 0.1 | 0.4 | <0.01 | 0.02 | 2.0 | 3 | 1.0 | <0.1 | 0.2 | <0.1 | <0.1 |

The aforementioned high-frequency vacuum induction melting crucible furnace 32 is disposed in the vacuum vessel 31. A crucible body 32a and an induction heating coil 32b wound on the crucible body 32a both are structured so that they each have water-passage spaces, which are supplied with hot water ($\geqq 60°$ C.), cold water or compressed air from the hot-water supply unit 33, depending on the purpose of use.

Crucible body 32a is made of water-cooled metal and circumferentially divided into a plurality of segments. An insulating material is fitted in between the segments so that an electromagnetic field may easily be formed in metal to be melted.

The aforementioned hot-water supply unit 33 is of concentric annular double structure including a hot-water tank 33a and a cold-water tank 33b surrounding the exterior (side wall portion) of the hot-water tank 33a. Hot water is contained in the hot-water tank 33a. Pure water, rather than industrial water is preferred to avoid calcium deposition in the piping. A heater 34 for heating water and maintaining the predetermined temperature thereof is placed in the hot water and fitted with a thermoelectric couple 35 and a temperature regulator 36. In FIG. 7, reference numeral 37 denotes a pump; 38, 38', hot-water piping; 39, 310, a thermoelectric couple and a temperature display for monitoring the temperature of the circulating hot water in the hot-water piping 38', respectively; and 311, a pressure gage for monitoring the pressure in the hot-water system.

The hot-water supply unit 33 is a closed circulating system and therefore effectively functions to raise the baking efficiency. The hot-water circuit is kept closed to ensure that a temperature of 100° C. or higher is maintained. In this case, any ordinary hot-water heater may be used; however, the problem is that high-temperature water is hardly available.

The aforementioned baking apparatus is used for removing water by baking parts of the vacuum vessel 31 and the inner wall thereof. Therefore, hot water is supplied from the hot-water supply unit 33 via the hot-water piping 38' to the hot-water jacket of the vacuum vessel 31 so as to keep the inside of the vacuum vessel 31 at a predetermined temperature (up to about 120° C. max.)

The setting of 120° C. max. is based on an understanding that any ordinary vacuum vessel is practically usable up to that temperature level because the vapor pressure then amounts to 1.95 kgf/cm$^2$ and because a total of 3.95 kgf/cm$^2$ is applied to the vacuum vessel 31 when the indentation pressure, about 2 kgf/cm$^2$, of the supply pump is added.

Thus, the gas (H$_2$O and the like) adsorbed on the inner surface of the vacuum vessel 31 or the internally-installed crucible and coil is driven off. In the meantime, the air inside the vacuum vessel 31 is discharged by the vacuum pump (not shown) and the oxidizing gas eluted is discharged (degassed). The heater 34 is de-energized after being satisfactorily degassed. Then cooling water is supplied to the cooling water tank 33b of the hot-water supply unit 33 to lower the temperature of the hot water and the gas on the inner surface of the vacuum vessel 31 is suppressed from being driven off, whereby an ultra-high vacuum is obtained. Then the metal can be melted and refined in an ultra-high vacuum by melting it in the induction heating type crucible 32.

As the method of baking the crucible 32 by simply heating the vacuum vessel 31 with hot water, the following method may be considered, though many problems remain to be solved.

(1) A method of raising the temperature of the crucible 32 is provided by using the heat radiated from the heated vessel 31 after stopping the supply of cooling water flowing through the water-passage space of the crucible 32 while the vacuum vessel 31 is being baked. However, the rate of the temperature increase of the crucible 32 becomes less than the rate of temperature increase of vacuum vessel 31 and consequently the temperature of the crucible 32 reaches a desired level after the vacuum vessel 31 has been degassed. Moreover, the attained temperature of the crucible 32 may be lower than that of the vacuum vessel 31, and the former cannot be degassed sufficiently.

(2) A method of coupling the hot-water circuit 38 to the crucible 32 has also been considered. However, cooling at a rate of several hundreds kW is required at the time of melting and this will make it necessary to attach a cooling device for dealing with the capacity.

(3) The moisture adsorbed by the material cannot be removed satisfactorily according to the methods (1), (2).

The present inventors have examined the possibility of developing a method and apparatus capable of degassing the vacuum vessel 31 simultaneously with the crucible 32, by connecting a hot-water circuit during the operation of baking the vacuum vessel 31, supplying cold water during the induction melting operation in the crucible without necessitating a special cooling device, and baking a material (metal) to be melted by induction heating during the operation of baking the vacuum vessel 31 as well as the crucible 32.

Figure 8:
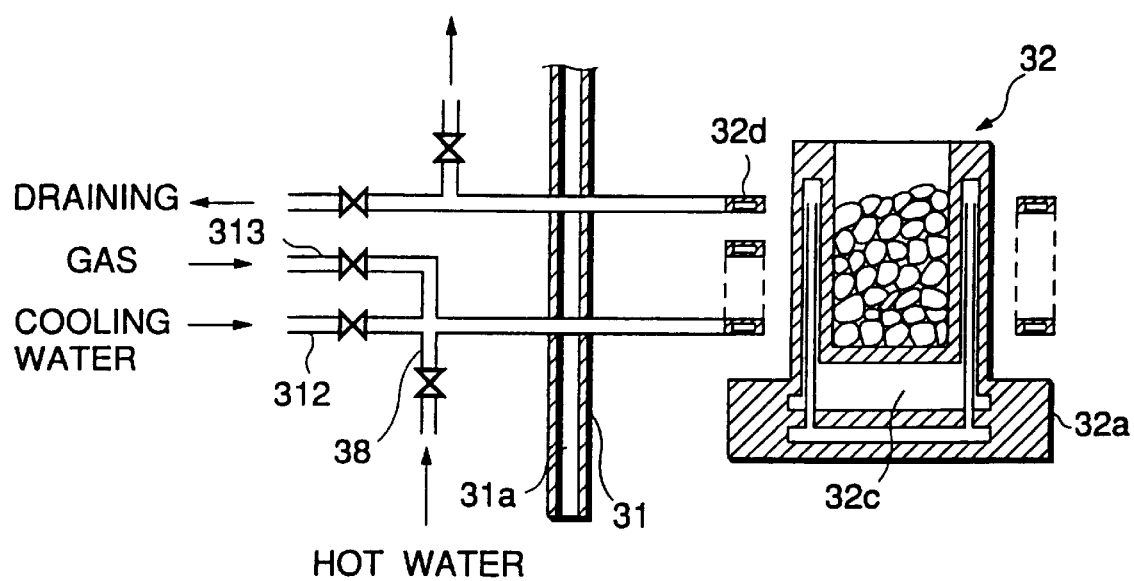
FIG. 8 shows a detailed sectional view of the peripheral portion of a crucible according to a further embodiment of the present invention.

According to the present invention, with reference to FIGS. 7 and 8, the vacuum vessel 31, the induction heating coil 32b of the crucible 32a and the hot-water supply unit 33 are coupled by the hot-water piping 38, 38', and the crucible 32a and the induction heating coil 32b are simultaneously coupled via valves to cold-water piping 312 and displacement piping 313. Further, hot water is supplied at the time of baking intended to discharge water vapor within the apparatus, whereas cold water is supplied to the crucible 32a and the coil 32b when the metal in the crucible 32a is heated. Particularly when hot water is switched over the cold water, compressed air is introduced into the piping lines and the water-passage space to drive out hot water and cooling water, to speed the displacement.

More specifically, valves V1, V2 are opened and valves V3, V4, V5 are closed when the inside of the apparatus is dried and baked prior to melting so as to supply hot water from the hot-water supply unit to the vacuum vessel 31, the crucible 32 and the coil 32b for degassing by vacuum exhausting. Upon termination of degassing, heating by heater 34 is stopped and cooling water is introduced into the cooling water tank 33b of the hot-water supply unit 33 to cool the hot water in the hot water tank 33a. The hot water ($\leqq 60°$ C.) is supplied to the water-passage jacket 21a of the vacuum vessel 31 when the temperature thereof is lowered.

Subsequently, the valves V1, V2 in the hot water piping 38, 38' are closed and the valves V4, V2, V6 therein are opened to send compressed air into the water-passage spaces 32c, 32d of the crucible 32a and the coil 32b to recover and discharge the remaining water in the duct into the hot water tank 33a. Then the valve V4 is closed and the valve V3 is opened to introduce the cooling water (industrial water) in the water-passage spaces 32c, 32d of the crucible 32a and the coil 32b for cooling purposes.

Further, high-frequency voltage is applied to the coil 32b so as to melt the molten metal in the crucible 32a by induction heating.

Subsequently, the valve V3 is closed and the valve V4 is opened before the baking is started to force out the cooling water (industrial water) in the water-passage spaces of the crucible and the coil by compressed air. Then the valve V4 is closed and the valve V5 is also closed and further the valves V1, V2 are opened to supply hot water again. Thus, baking and melting are alternately carried out by alternately supplying hot water (pure water) and industrial water through this process.

Although the hot water or pure water free from calcium deposition at high temperatures is preferred for use, the mixture of the hot water with industrial water should be minimized during the aforementioned switching operation. Although the compressed air is used to drive out the hot or cooling water in order to minimize replenishing the hot-water tank 33a with water, this is not necessarily the operation required As set forth above, since hot water is supplied to portions where cooling water is passed through as in the crucible 32a and the coil 32b according to the present invention, the apparatus can be baked totally and uniformly, and the structure like this is most suitable for baking by the use of hot water.

According to the present invention, the apparatus can be totally degassed simultaneously when the vacuum vessel is degassed. Moreover, the melting operation is performed without necessitating a special cooling device and the whole can be baked uniformly by the use of hot water under the most suitable method of baking the melting furnace by the water-cooling crucible.

What is claimed is:

1. A baking method in a vacuum induction melting apparatus, said method comprising the steps of:

providing the vacuum induction melting apparatus comprising a vacuum vessel, an induction heating metal crucible placed in the vacuum vessel, an induction heating coil surrounding the crucible and an externally-installed hot and cooling water supply unit, wherein the vacuum vessel, metal crucible and heating coil each have a water-passage space therein; and supplying circulating hot or cooling water in said water-passage spaces of each of the vacuum vessel, the metal crucible and the induction heating coil.

2. The baking method of claim 1, wherein the circulating water from the hot and cooling water supply unit is high-temperature water when the inside of the melting apparatus is baked, and low-temperature water when a material to be melted is induction-heated in the crucible.

3. The baking method of claim 2, wherein prior to switching circulating water supplied to the water-passage space of each of the vacuum vessel and the coil from hot water to cooling water or from cooling water to hot water the resident water is discharged from the space by introducing compressed air into the space.

4. The baking method of claim 3, wherein the baking is carried out by holding the temperature of the circulating hot water at 60° C. or higher.

5. A vacuum induction melting apparatus, comprising:

a vacuum vessel having a double jacket structure which is heated by circulating hot water supplied from an externally-installed heat exchanger;

a melting furnace in the form of a high-frequency induction heating type metal crucible that is water-cooled and a high-frequency induction coil that is wound around the crucible and is water-cooled;

a vacuum pump capable of producing a total pressure within the vacuum vessel at $1\times10^{-8}$ Torr or lower;

a control-gas introducing port for regulating the atmosphere within the vacuum vessel.

6. The vacuum induction melting apparatus of claim 5, wherein the metal crucible and the high-frequency induction coil are cooled by circulating water supplied from the heat exchanger.

* * * * *